United States Patent
Ishikawa et al.

[11] Patent Number: 5,790,238
[45] Date of Patent: Aug. 4, 1998

[54] PHOTOGRAPHIC IMAGE EXPOSING APPARATUS

[75] Inventors: Masazumi Ishikawa; Toru Tanibata, both of Wakayama, Japan

[73] Assignee: Noritsu Koki Co., Ltd., Wakayama-ken, Japan

[21] Appl. No.: 790,345

[22] Filed: Jan. 27, 1997

[30] Foreign Application Priority Data

Jan. 30, 1996 [JP] Japan .................................. 8-013964

[51] Int. Cl.$^6$ .................................................. G03B 27/72
[52] U.S. Cl. .............................. 355/35; 355/38; 355/71
[58] Field of Search .......................... 355/32–38, 67–69, 355/77, 71, 70; 250/226; 356/419, 418

[56] References Cited

U.S. PATENT DOCUMENTS

| 4,589,766 | 5/1986 | Fursich et al. ................ 355/38 |
| 4,951,084 | 8/1990 | von Stein et al. ............. 355/38 |
| 5,122,831 | 6/1992 | Suzuki ........................... 355/37 |

FOREIGN PATENT DOCUMENTS

| 2199447 | 8/1990 | European Pat. Off. . |
| 5002227 | 1/1993 | European Pat. Off. . |
| 6027551 | 2/1994 | European Pat. Off. . |
| 615154 | 9/1994 | European Pat. Off. . |

Primary Examiner—D. Rutledge
Attorney, Agent, or Firm—Jordan and Hamburg

[57] ABSTRACT

A photographic image exposing apparatus includes a white light source and a filtering device provided between the white light source and a photographic paper. The filtering device has color filters corresponding to respective light spectrums and is operable to interrupt a light beam traveling from the white light source to the photographic paper to separately allow the corresponding light spectrums to pass therethrough. A light amount adjuster is operable to change respective interrupting times of the color filters with respect to a predetermined exposing range.

12 Claims, 9 Drawing Sheets

PHOTOGRAPHIC IMAGE EXPOSING APPARATUS

BACKGROUND OF THE INVENTION

The present invention relates to a photographic image exposing apparatus for exposing a photographic image of a color film or equivalent captured as image data on a photographic paper.

An exposing system has been recently adapted for photographic image exposing apparatuses, according to which when a photographic image of a color film is printed on a photographic paper, the photographic image is separated into a plurality of image components in accordance with light wavelengths of B, G, R, etc., (hereinafter referred to as "light-wavelength components") to be taken in as image data, which in turn is converted into light signals on the colors corresponding to the light-wavelength components and then the light signals are output onto a photographic paper for exposure. In this exposing system, however, since sensitivities of the photographic paper varies with light-wavelengths, e.g., more sensitive and brighter for B, G than for R, if all the light-wavelength components are projected at the same light amount, precise exposure cannot be obtained. Because of this, a light adjustment filter is provided in an optical path of an exposing head for color balance. Further, since the use of the light adjustment filter causes undesired variations in light source, a diffusion plate is inserted in the optical path to restrict occurrence of the variations in the light source.

In such conventional exposing system, however, since the light adjustment filter pitches the cutting of light at dark component of light, losses in light amounts are caused with respect to bright component of light, resulting in reduction in exposure ability. In addition, the insertion of the diffusion plate causes further reduction in the light amounts, resulting in further reduction in the exposure ability.

SUMMARY OF THE INVENTION

The object of the invention is to provide a photographic image exposing apparatus which can perform precise exposure without reduction in exposure ability.

According to the present invention, a photographic image exposing apparatus comprise: an exposing device which exposes photographic paper by light spectrums corresponding to separated color image components constituting image data; and a light amount adjuster which adjusts the amount of light exposing the photographic paper in accordance with the separated color image components.

With the thus constructed photographic image exposing apparatus, photographic paper is exposed by light spectrums corresponding to separated color image components constituting image data. The light amount is adjusted in accordance with the separated color image components. This ensures an improved and more precise exposure.

The exposing device may be provided with: a white light source; and a filtering device provided between the white light source and the photographic paper, the filtering device having color filters corresponding to respective light spectrums and operable to interrupt a light beam from the white light source to the photographic paper to separately allow the corresponding light spectrums to pass therethrough. Further, the light amount adjuster may be made to change the respective interrupting times of the color filters with respect to a predetermined exposing range.

In this construction, the filtering device is provided between the white light source and the photographic paper. The filtering device has the color filters corresponding to the respective light spectrums, and is operable to interrupt a light beam enroute from the white light source to the photographic paper to separately allow the corresponding light spectrums to pass therethrough. The respective interrupting times of the color filters are changed in accordance with the separated color image components. Accordingly, the light amount adjustment is easily performed by a simplified construction.

Further, the filtering device may be constructed by a disc member rotatable at a constant speed and arranged with the color filters in a circumferential direction, the color filters having different areas. In this construction, the disc member is rotated at a constant speed. Accordingly, the interrupting times of the color filters are made different from one another by the color filters having different areas.

Further, there may be provided a paper transporting device operable to reciprocatingly transport the photographic paper a predetermined range. In this case, it may be preferable that the light amount adjuster changes the transporting speed of the transporting device in accordance with separated color image components. Further, it may be appreciated that the exposing device is operable to execute exposure in forward and backward transports of the paper transporting device, a light spectrum for the forward transport being generated along reading of image data in a first direction and a light spectrum for the backward transport being generated along reading of image data in a second direction opposite to the first direction. This construction makes possible reciprocating exposure, which thus remarkably reduces the exposure time.

The light amount adjuster may preferably adjust the respective amounts of the light spectrums for the separated color image components based on respective sensitivities of the photographic paper for the light spectrums. The light amount is adjusted based on the respective sensitivities of the photographic paper for the light spectrums, thus providing more suitable exposure.

Also, the light amount adjuster may preferably adjust the respective amounts of the light spectrums for the separated color image components based on respective output performance characteristics of the exposing device for the light spectrums. This can similarly improve the exposure precision.

These and other objects, features and advantages of the present invention will become more apparent upon a reading of the following detailed description and accompanying drawings.

DETAILED DESCRIPTION OF THE PREFERRED EMBODIMENT

Referring to the accompanying drawings, embodiments of the invention will be described below. It is to be understood, however, that the scope of the invention is by no means limited to the following embodiments.

Figure 1:
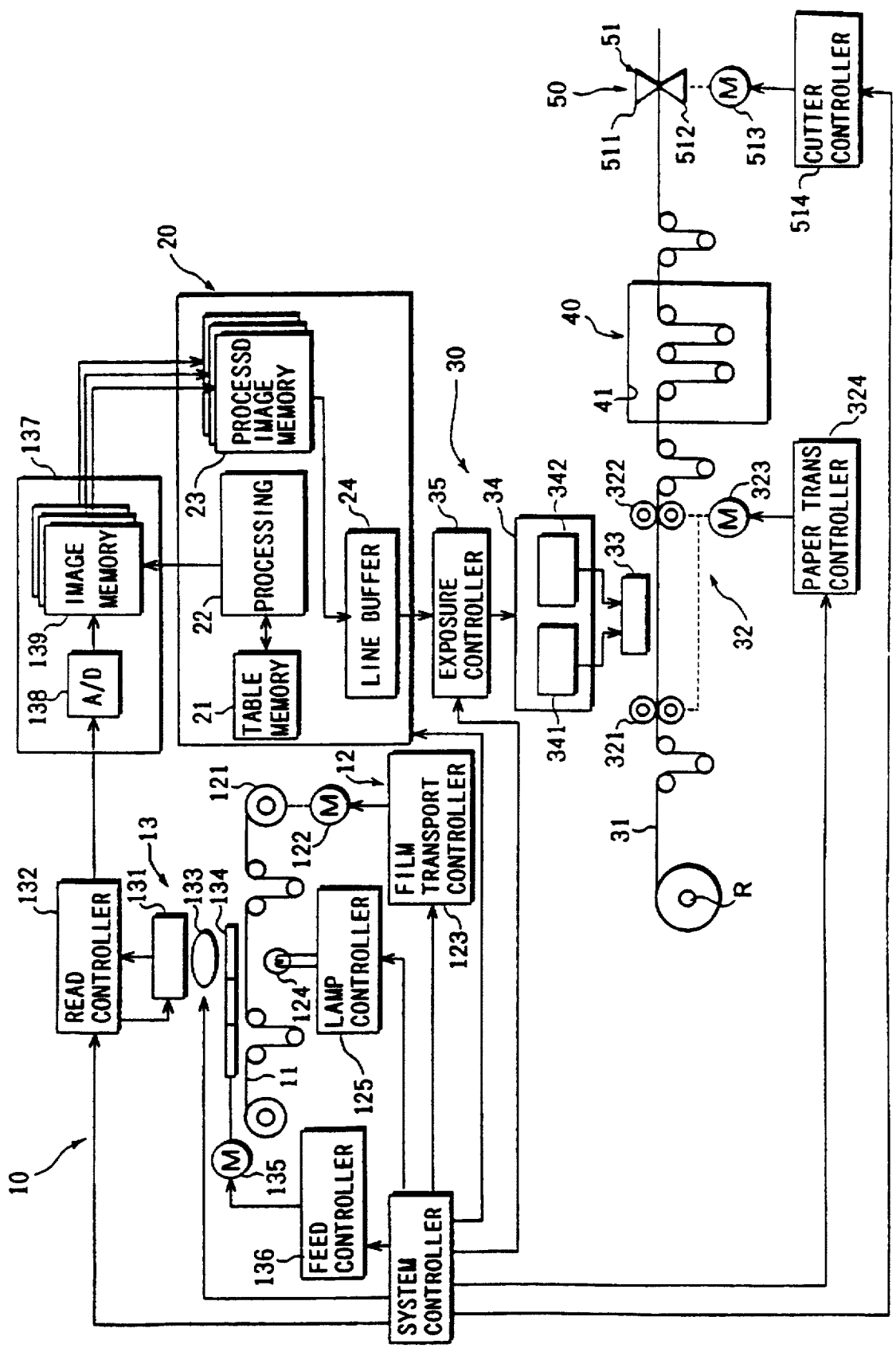
FIG. 1 is a schematic diagram showing a construction of an automatic photo printing system to which a photographic image exposing apparatus of the invention is applied.

FIG. 1 is a schematic diagram of construction of an automatic photo printing system to which a photographic image exposing apparatus of the invention is applied. In FIG. 1, the automatic photo printing system comprises an image data capturing section 10 for capturing a photographic image from a negative film or a positive film and storing it in its memory; an image data processing section 20 for performing a prescribed data processing and image edit for the captured image data; an image exposing section 30 including a photographic image exposing apparatus of the invention where thus processed and edited image data is converted into light signals used to expose the photographic paper; a developing section 40 for developing the exposed photographic paper; a cutting section 50 for cutting the developed and dried photographic paper into each individual frame; and a system controller 60 for controlling operations of the entire system.

The image data capturing section 10 comprises a film transporting section 12 for transporting the developed color film (a negative film or a positive film) 11, frame by frame to a reading position and an image reading section 13 for reading a photographic image of each frame of the film 11.

The film transporting section 12 includes a winding roller 121, a driving motor 122 for rotationally driving the winding roller 121, a film transport controller 123 for controlling the drive of the driving motor 122, a lamp 124 providing a light source at a position under the film 11, and a lamp controller 125 for controlling an amount of light emitted from the lamp 124. The driving motor 122 is rotated under control of signals from the film transport controller 123, to intermittently transport the film 11, frame by frame, via the winding roller 121, allowing each frame to be projected by the lamp 124 sequentially.

The image reading section 13 includes an image pickup device 131 comprising a CCD or the like arranged in a matrix form to read a photographic image of each frame; a read controller 132 for controlling the image reading of the image pickup device 131; a lens 133 for forming the image of each frame on a photoreceptive surface of the image pickup device 131; an optical filter 134, inserted in between the film 11 and the lens 133, for separating the image on the film into three color components of R, G, B; a filter driving motor 135 for driving the optical filter 134 to change in position; a filter feed controller 136 for controlling the drive of the filter driving motor 135; a storage section 137 for capturing picture signals read by the image pickup device 131.

The read controller 132 provides image pickup timing signals to the image pickup device 131 so that the image pickup device 131 picks up an image in each frame by picture elements. The read controller 132 also provides read-out timing signals to the image pickup device 131 to output picture signals corresponding to the picked up image.

For capturing the picture signals of the image of each frame separated into the three color image components of R, G, B, the filter feed controller 136 drives the filter driving motor 135 to rotate on a frame-to-frame basis, so as to shift the optical filter 134 in sequence. This allows each color region of the optical filter 134 to be inserted in between the frame to be projected and the lens 133.

The storage section 137 comprises an A/D converter 138 for converting picture signals in analogue form output from the read controller 132 into image data in digital form with an 8 bit gradation level, for example, and an image memory 139 including a RAM or the like for storing the image data output from the A/D converter 138. The image memory 139 comprises memories for the three color image components R, G, B, in which the image data of the colors of R, G, B of the photographic image in each frame is contained at specified addresses by an unillustrated address controller.

The image data processing section 20 includes a table memory 21 in which edit data on print-layout, magnification of print, etc. for an image of each frame is contained; a processing section 22 for reading out image data contained in the image memory 139 and processing the data based on edit data in the table memory 21, such as compression or expansion of the image data and specification of address for assignment; a processed image memory 23 for storing the processed image data; and a line buffer 24 for temporally storing one line of the processed image data as needed.

The image exposing section 30 comprises a photographic paper transporting section 32 for transporting a rolled, elongate, photographic paper 31 wound on a roller R to a position of a shutter array of an exposing head portion described below; an exposing head portion 33 for exposing the rolled photographic paper 31; an exposing head controller 34 including a color filter controller 341 and an image data output controller 342 both for controlling the exposing head portion 33; and an exposure controller 35 for controlling the photographic paper transporting section 32 and the exposing head controller 34 in synchronism with each other of the basis of the image data on each of the color image components of R, G, B delivered from the line buffer 22.

The photographic paper transporting section 32 includes a first pair of transporting rollers 321 and a second pair of transporting rollers 322 which are located upstream and downstream from the exposing head portion 33, respectively, a driving motor 323 for rotationally driving the first and second pairs of rollers 321, 322, and a photographic paper transport controller 324 for controlling the drive of the driving motor 323. The driving motor 323 is rotated under control of signals from the photographic paper transport controller 324 to transport the rolled photographic paper 31 a distance corresponding to one line of image data at a time in response to time required for the one line of image data to be exposed. This allows the exposing head 33 to expose the rolled photographic paper 31 one line at a time, with a timing corresponding to the rate at which the rolled photographic paper 31 is transported. Exposure is made several times to complete the exposure of the photographic image of one frame.

Figure 2:
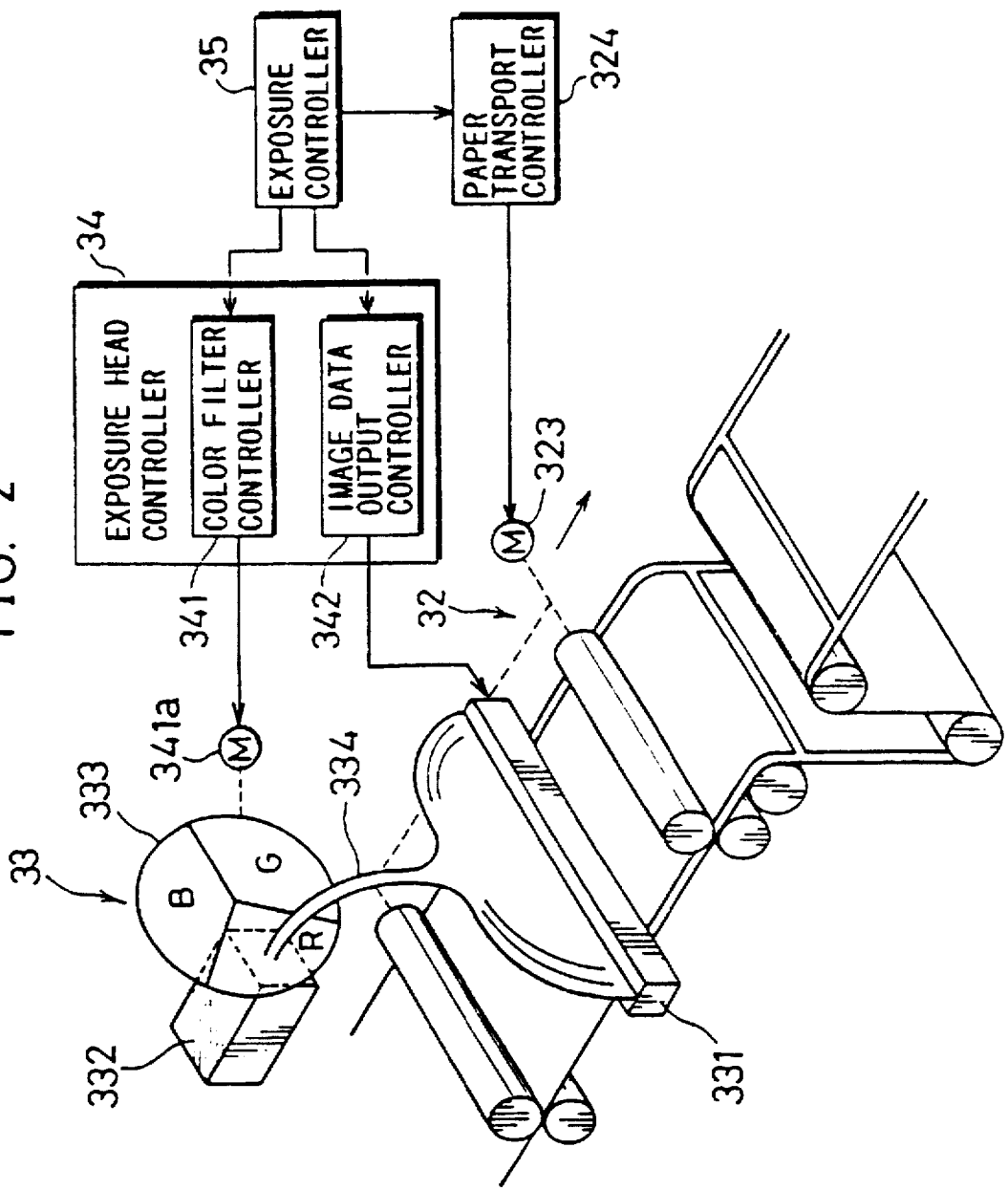
FIG. 2 is an illustration of an exposing head portion of the automatic photo printing system shown in FIG. 1.

The exposing head portion 33 operates to convert the image data into light signals and output them onto the rolled photographic paper 31. The exposing head portion 33 includes, as shown in FIG. 2, a shutter array 331 including a PLZT element 100, shown in FIGS. 3A and 3B, as shutter means provided along a widthwise direction of the rolled photographic paper 31; a white light source 332; a disc-like color filter 333 having three color regions of R, G, B provided between the shutter array 331 and the white light source 332; and bundles of optical fibers 334 for delivering light from the white light source 332 passing through the color regions of the disc-like color filter 333 to the shutter array 331.

Figure 3B:
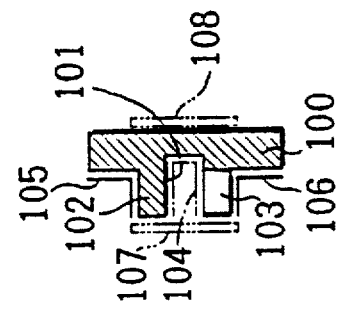
FIGS. 3A, 3B are an illustration of a construction of a shutter array including PLZT element, FIG. 3A showing a plan view of the shutter array, and FIG. 3B showing a side sectional view of the same.
Figure 3A:
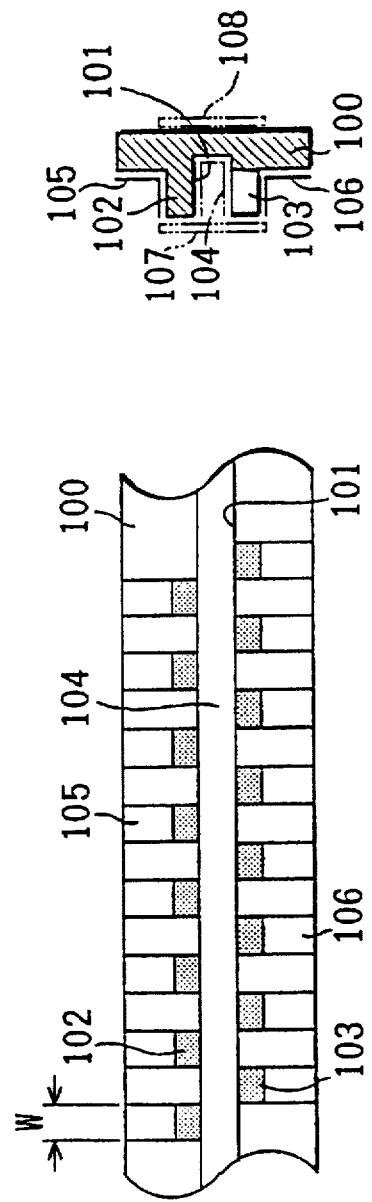

The PLZT element 100 is made of a transparent, ferroelectric ceramic material produced by adding lanthanum to lead zirconate titanate, to utilize electro-optics effects of the material. In the shutter array 331, for example, a number of projections 102, 103 are formed, displaced from each other by half pitch, as shown in FIGS. 3A and 3B, at both sides of a groove 101 formed at a lengthwise center portion of the elongate PLZT element 100. A common electrode 104 is provided in the groove 101 and on first surfaces of the projections 102, 103 on the side of the groove 101. Driving electrodes 105, 106 are formed on second surfaces opposite to the first surfaces of the projections 102, 103 and on flat surface portions of the PLZT element 100. Polarization films 107, 108, whose planes of polarization are made orthogonal to each other, are provided at the projection 102, 103 side of the PLZT element 100 and at the bottom side of the same, respectively.

Thus constructed shutter array 331 permits light incident from the polarization film 108 side to be transmitted toward the polarization film 107 through the projections 102, 103, when required levels of voltage for the colors of R, G, B are applied to between the common electrode 104 and the driving electrodes 105, 106, but it permits the light to be cut off, when the application of the voltage is stopped. Accordingly, the portions of the projections 102, 103 on the polarization film 107 side (the dotted parts in FIG. 3A) form shutter portions for making on-off control on the transmission of light. The width W between the projections 102, 103 is set to be 84.6 µm, for example. The inner diameter of each optical fiber is set to be larger than the width W of the shutter portions so that light is introduced from a single optical fiber into a plurality of shutter portions to provide a higher resolution. This provides the result that when the driving voltage is applied to the shutter portions in a position corresponding to picture elements of the image data, the related shutter portions are opened to throw the light passed through the disc-like color filter 333 onto the rolled photographic paper 31, allowing the rolled photographic paper 31 to be exposed by the light.

The number of the shutter portions of the shutter array corresponds to the number of the picture elements in one line of image data. The exposure controller 35 delivers the one line of image data on the colors of R, G, B delivered from the line buffer 24 to the image data output controller 342 which in turn supplies the driving voltage to the shutter portions corresponding to the delivered image data. In this embodiment, the shutter array 331 has the shutter portions which are spaced in two rows, as shown in FIG. 3, so that one line of image data on each color R, G, B is output shifted by the arrangement pitch. This allows the image data on the colors R, G, B of the same photographic image to be superimposed on the same line.

The white light source 332 includes a tungsten halogen lamp and a mirror tunnel through which the light of the lamp is introduced into the optical fibers 334. The light of the white light source stays "on" whenever the rolled photographic paper 31 is subjected to exposure.

Figure 4:
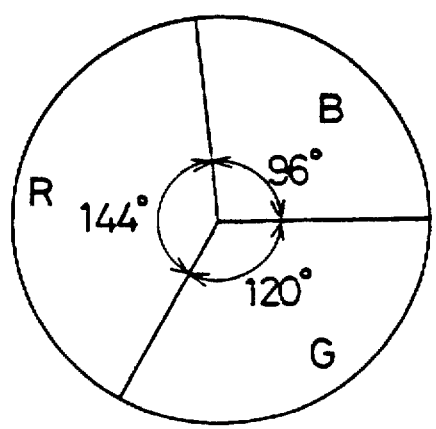
FIG. 4 is an illustration of a construction of disc-like color filter.

The disc-like color filter 333 is divided into three different color regions in the order of B, G, R along a circumferential direction, and is rotated along the circumferential direction at a constant speed. The thus constructed disc-like color filter 333 forms light amount adjuster. Specifically, in this embodiment, the disc-like color filter 333 is sectored at angles of 96, 120 and 144 degrees into the B, G and R color regions, respectively, as shown in FIG. 4. These angles correspond to exposing times of the B, G, R color light components in the case that the disc-like color filter 333 is rotated at a constant speed to optimize their respective exposing times in accordance with sensitivities of the rolled photographic paper 31. Specifically, the angles are determined in such a way that the B color light component to which the photographic paper is highest sensitized is allotted a shortest exposing time, and the R color light component to which the photographic paper is lowest sensitized is allotted a longest exposing time.

Figure 5:
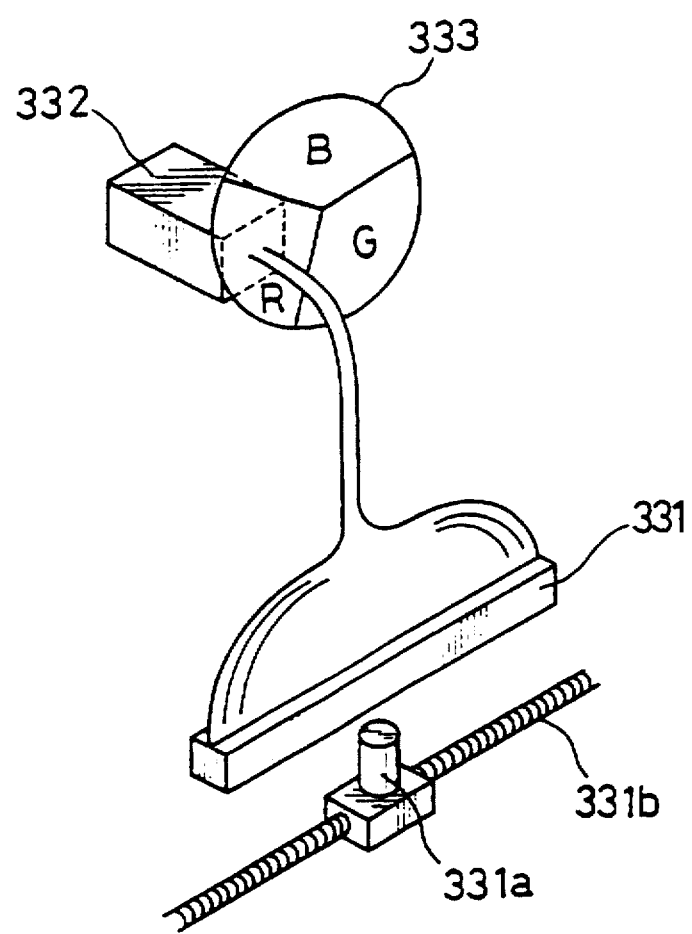
FIG. 5 is an illustration of a measurement of a light amount of output light at an exposing head portion.

The areas of the three different regions are determined as follows. As shown in FIG. 5, on an exposure side of the shutter array 331 is provided an optical sensor 331a to detect respective light amounts of the B, G, R light components transmitted through the three color regions of the color filter 333 whose positions are changed in sequence. The optical sensor 331a is made movable along the widthwise direction of the shutter array 331 via a threaded shaft 331b. An averaged value of the light amount measurements at several different points in the widthwise direction of the shutter array 331 is taken as an amount of each color light component. Alternatively, a measurement at a single point, e.g., a widthwise central portion, of the shutter array 331 may be taken as a light amount of each color light component. For this measurement, the B, G, R sensitivities of the photographic paper 31 and the B, G, R sensitivities of the optical sensor 331a are necessary as initial data.

In the ease that measurements of the optical sensor 331a are 0.75V, 0.85V and 100V for the B color light, the G color light and the R color light, respectively, and sensitivity ratios of the photographic paper, ratios of B and G to R, are 1.6 and 1.3 where R=1, and sensitivity ratios of the sensor, ratios of B and G to R, are 0.8 and 0.9 where R=1, the following color light amount ratios can be obtained: $(0.75/1.00)\times(1/0.8)\times(1.6/1)=1.5$ on the color light, and $(0.85/1.00)\times(1/0.9)\times(1.3/1)=1.2$ on the G color light, wherein the R color light is 1. From these ratios, the ratio of the exposing time for the B color light to the exposing time for the R color light is $1/1.5=0.67$ and the ratio of the exposing time for the G color light to the exposing time for the R color light is $1/1.2=0.83$. As a result of this, the angle of the B color region of the disc-like color filter is $(0.67/(0.67+0.83+1.00)\times360=96°$, the angle of the G color region of the disc-like color filter is $(0.83/(0.67+0.83+1.00)\times360=120°$, and the angle of the R color region of the disc-like color filter is $(1.00/(0.67+0.83+1.00)\times360=144°$.

The above-mentioned relative proportion of the color regions may also be obtained by another method in which, after a photographic paper is actually exposed to the B color light, the G color light and the R color light, for the same exposing time and with the same print-pattern, the color concentration levels of the photographic paper are measured with a densitometer. This method is not required to consider the sensitivities of the photographic paper and the sensitivities of the optical sensor, though it is required to possess in advance the relational expression between the concentration and the light amounts as initial data.

The above-mentioned relative proportions of the color regions are required to be varied depending on output performance characteristics of the exposing head portion 33 with respect to the color light, or depending on a light wavelength component of the white light source 332, light transmission properties of the disc-like color filter 333, and the like. The measuring method shown in FIG. 5 for seeking the light amount ratios of the color light provides determination of the relative proportions of the color regions, inclusive of the output performance characteristics of the exposing head. However, since the output performance characteristics of the exposing head 33 vary with time, the relative proportions of the color regions are required to be varied in response to the changes in the output performance characteristics of the exposing head.

Figure 6:
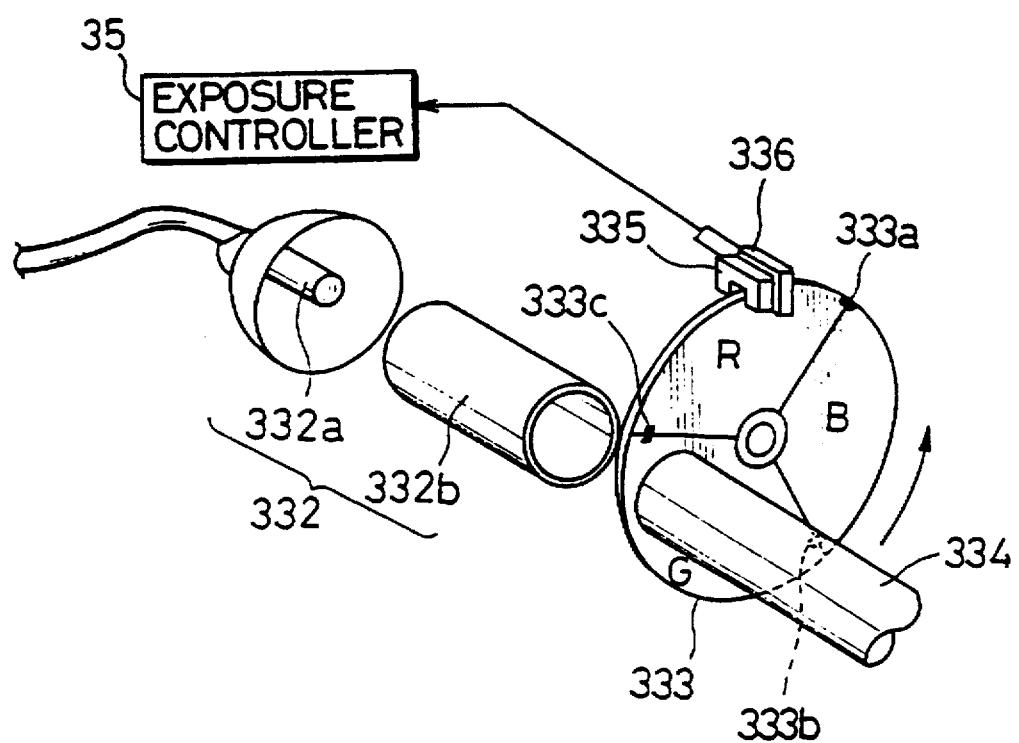
FIG. 6 is an illustration of a detection of color regions of the disc-like filter at the exposing head portion.

The disc-like color filter 333 is provided with position detecting marks 333a, 333b, 333c at the boundaries of the color regions of B, G, R, as shown in FIG. 6. The position detecting mark 333a is formed at the outer edge at the boundary between the R color region and the B color region. The position detecting mark 333b is formed at a location at a certain distance inward from the outer edge at the boundary between the B color region and the G color region. And, the position detecting mark 333c is formed at a location at the same distance as in the position detecting mark 333b inward from the outer edge at the boundary between the G color region and the R color region.

At an upper portion of the disc-like color filter 333, a home position sensor 335 for detecting the position detecting mark 333a and a color position sensor 336 for detecting the position detecting marks 333b and 333c are disposed side by side.

When detecting the position detecting mark 333a, the home position sensor 335 delivers the detecting signals to the exposure controller 35. The exposure controller 35 delivers shutter operating signals to the image data output controller 342 after the disc-like color filter 333 is rotated from the position of the home position sensor 335 at a given rotational angle until a leading end portion of the B color region reaches an optical path defined between the white light source 332 (which is formed by a tungsten halogen lamp 332a and a mirror tunnel 333b) and optical fibers 334. After having received the signals from the exposure controller, the image data output controller 342 outputs signals to drive the shutter portions of the shutter array 331 corresponding to the image data, to open the related shutter portions, thus allowing the photographic paper 31 to be exposed to the B color light after as the disc-like color filter 333 is rotated until the trailing end portion of the B color region reaches the optical path.

When detecting the position detecting mark 333b, the color position sensor 336 delivers the detecting signals to the exposure controller 35. The exposure controller 35 delivers shutter operating signals to the image data output controller 342, after the disc-like color filter 333 is rotated from the position of the color position sensor 336 at a given rotational angle until a leading end portion of the G color region reaches the optical path. After having received the signals from the exposure controller, the image data output controller 342 outputs signals to drive the shutter portions of the shutter array 331 corresponding to the image data, to open the related shutter portions, thus allowing the photographic paper 31 to be exposed to the G color light after the disc-like color filter 333 is rotated until the trailing end portion of the G color region reaches the optical path.

Further, when detecting the position detecting mark 333c, the color position sensor 336 delivers the detecting signals to the exposure controller 35. The exposure controller 35 delivers shutter operating signals to the image data output controller 342, after the disc-like color filter 333 is rotated from the position of the color position sensor 336 at a given rotational angle until a leading end portion of the R color region reaches the optical path. After having received the signal from the exposure controller, the image data output controller 342 outputs signals to drive the shutter portions of the shutter array 331 corresponding to the image data, to open the related shutter portions, thus allowing the photographic paper 31 to be exposed to the R color light after the disc-like color filter 333 is rotated until the trailing end portion of the R color region reaches the optical path.

The reason why the position detecting mark 333a is detected by the home position sensor 335 and the other position detecting marks 333b and 333c are detected by the color position sensor 336 is that the photographic paper is subjected to exposure in such a manner that the same picture element are exposed to the color light in the order of B-G-R. With the above-mentioned construction, the leading end portion of the B color region is detected by the detection signals from the home position sensor 335, the leading end portion of the G color region is detected by the first sequential detection signals from the color position sensor 336, and the leading end portion of the R color region is detected by the second sequential detection signal therefrom.

The above construction may be modified by using a stepping motor to rotate the disc-like color filter 333. In this modification, only the position detecting mark 333a and the home position detecting sensor 335 are required for detecting the leading end portions of all the color regions. That is because the leading end portion of the B color region is detected by the home position detecting sensor 335 detecting the position detecting mark 333a, whereas the leading ends of the G color region and R color region detected by counting a number of driving pulses sent to the stepping motor.

The exposing head controller 34, which controls the drive of the exposing head portion 33 as described above, comprises a color filter controller 341 and the image data output controller 342. The color filter controller 341 controls rotation of a driving motor 331a to regulate the rotational drive of the disc-like color filter 333. The image data output controller 342 permits the driving voltage to be applied to the shutter portions of the shutter array 331 to open the shutter portions corresponding to specific picture elements. This allows the color light, which is delivered from the disc-like color filter 333 through the optical fibers 334, to be output onto the rolled photographic paper 31 to expose the rolled photographic paper 31 to the color light.

The exposure controller 35 controls the photographic paper transporting section 32 and the exposing head controller 34 in synchronization with each other, on the basis of the image data on the three colors R, G, B delivered from the line buffer 24, as described above, to allow the photographic image of each frame to be precisely exposed on the rolled photographic paper 31.

The developing section 40 includes a liquid tank 41 which is filled with a developing solution. The rolled photographic paper 31 exposed in the exposing head portion 33 is transported by an exposed photographic paper transporting section, not shown, provided at a position downstream from the liquid tank 41 and is immersed into the developing solution in the liquid tank 41 to emerge or produce a visible image from a latent image produced by exposing the rolled photographic paper 31.

The cutting section 50 comprises a cutter 51 to cut the rolled photographic paper 31, which is developed in the developing section 40 and then dried, in the widthwise direction. The rolled photographic paper 31, transported to the cutting section 50 by a developed photographic paper transporting section (not shown) provided at a position upstream from the cutter 51, is cut into each individual frame.

The cutter 51 comprises an upper wedge-like cutting edge 511 and a lower wedge-like cutting edge 512 which are located above and below the rolled photographic paper 31. The upper cutting edge 511 and the lower cutting edge 512 stays apart from each other until a related part of the rolled photographic paper 31 comes to a cutting position. When the related part of the rolled photographic paper 31 comes to the cutting position, the upper and lower cutting edges 511, 512 move past the rolled photographic paper 31 to each other to cut the photographic paper 31 in the widthwise direction. The cutter 51 is provided with a driving motor 513 for driving the upper and lower cutting edges 511 and 512 up and down and a cutter controller 514 for controlling the drive of the driving motor 513.

The system controller 60 includes a CPU and a ROM containing a control program, not shown, and performs centralized control of operations of the controllers by giving a command to each of the controllers in accordance with the control program. This allows the photographic images to be read from the film 11, the read photographic images to be printed on the rolled photographic paper 31, and the developed rolled developing paper to be cut into each individual frame.

Next, a brief explanation of the operations of the automatic photo printing system will be given below.

First, based on the command from the system controller 60, photographic images of the negative film 11 transported via the film transporting section 12 of the image data capturing section 10 are sequentially obtained in the form of three color sorted image data R, G, B by the image pickup device 131 of the image reading section 13. Then, the read image data is converted into digital data by the A/D converter 138 and is contained in the image memory 139. During this operation, the transport of the film 11 is controlled by the film transport controller 123, and the position of the optical filter 134 is switched sequentially by the filter feed controller 136 so that the photographic images read are separated into three color components of R, G, B.

Then, from the table memory 21 of the image data processing section 20, prescribed process data or edit data on print-layout, magnification of print, and the like of the photographic image of the frame to be exposed on the rolled photographic paper 31 is read out. And, on the basis of the process data or edit data, the image data is read out from the image memory 139 by the processing section 22 and is processed or edited in to the image data form for each frame. The resulting image data is recorded in the processed image memory 23 in the form of three color sorted image data R, G, B on the photographic image of the frame.

Then, the image data for a specified frame is read from the processed image memory 23 and then is delivered by one line at a time to the line buffer 24. Then, the image data is read line by line from the line buffer 24 by the exposure controller 35 and the read image data is delivered to the exposing head controller 34. In the exposing head controller 34, the disc-like color filter 333 is controlled to rotate at a constant speed by the color filter controller 341, while also the drive of the shutter array 331 is controlled by the image data output controller 342, for the exposure of the rolled photographic paper 31.

After the exposure of one line of the image data is completed, the photographic paper transporting section 32 is actuated under control of the exposure controller 35 to transport the rolled photographic paper 31 downstream by a length corresponding to the next one line of exposure. The subsequent exposure based on the next one line of image data is started. Thus, the exposure controller 35 allows the time required for one line of image data to be exposed by the exposing head portion 33 and the rate at which the rolled photographic paper 31 is transported by the photographic paper transporting section 32 to be synchronized with each other, for completion of correct exposure of the photographic image of the frame to be exposed on the photographic paper 31.

Figure 7:
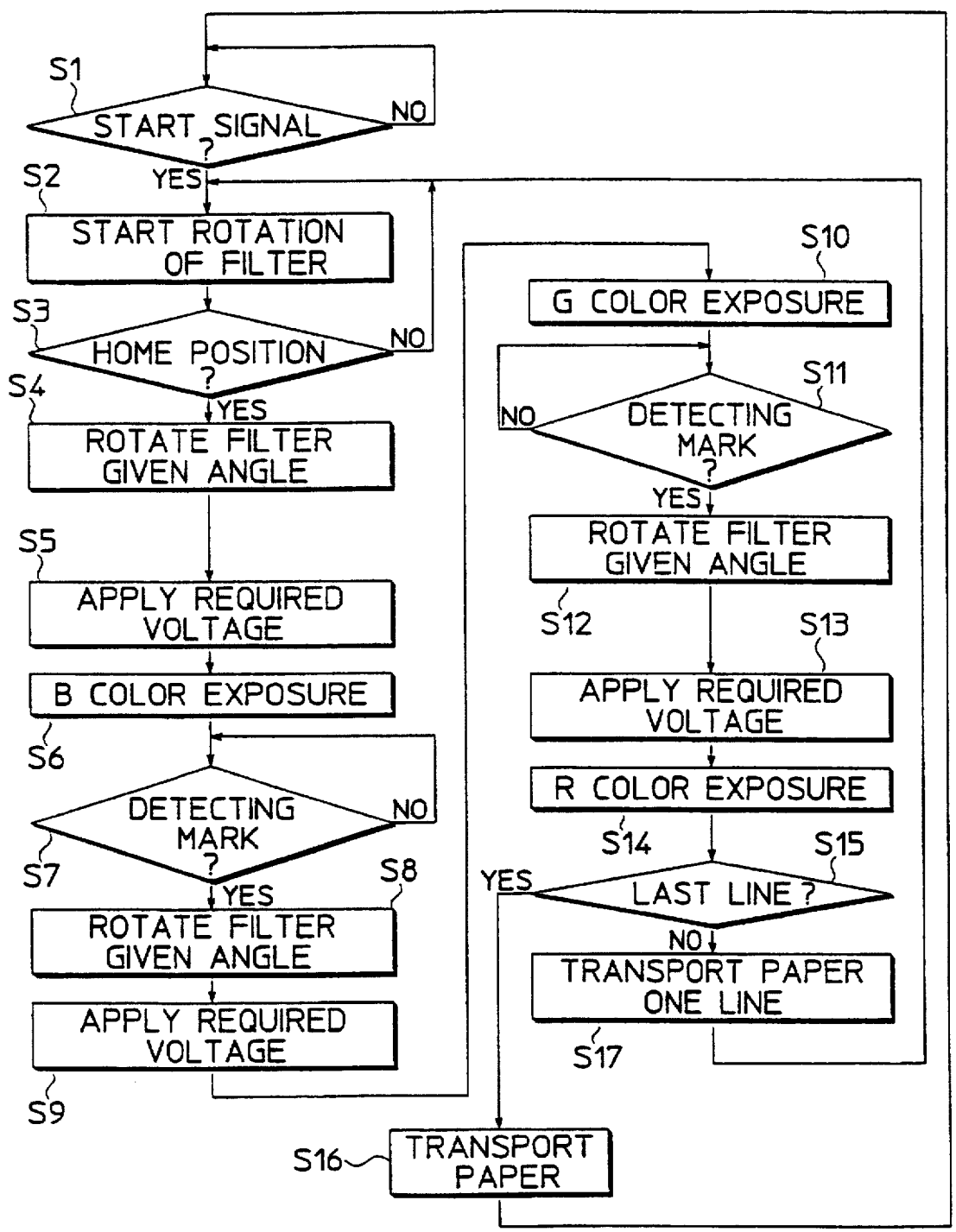
FIG. 7 is a flowchart illustrating operations of the exposing head portion.

FIG. 7 is a flowchart illustrating exposing operations of the exposing head portion 33. When the exposure controller 35 detects exposure starting signals (Step S1), the disc-like color filter 333 starts rotating (Step S2). After the home position sensor 335 detects the home position mark 333a (Step S3), the disc-like color filter 333 is rotated only a given angle from the position of the home position sensor 335 till the optical path is formed between the white light source 332 and the optical fiber 334 (Step S4). Thereafter, the driving voltage to be applied to the shutter array 331 is switched a required voltage value (e.g., 45V) (Step S5), which in turn is applied to specified shutter portions of the shutter array 331 under control of signals from the image data output controller 342, allowing the rolled photographic paper 31 to be exposed to the B color light (Step S6).

Next, when the disc-like color filter 333 is rotated and the color position sensor 336 detects the color position detecting mark 333b (Step S7), the disc-like color filter 333 is rotated a given angle from the position of the color position sensor 336 till the optical path is formed (Step S8). Thereafter, the driving voltage to be applied to the shutter array 331 is switched to a required voltage value (e.g., 50V) (Step S9), which in turn is applied to the specified shutter portions of the shutter array 331 under control of signals from the image data output controller 342, allowing the rolled photographic paper 31 to be exposed to the G color light (Step S10).

Next, when the disc-like color filter 333 is rotated and the color position sensor 336 detects the color position detecting mark 333c (Step S11), the disc-like color filter 333 is rotated a given angle from the position of the color position sensor 336 till the optical path is formed (Step S12). Thereafter, the driving voltage to be applied to the shutter array 331 is switched to a required voltage value (e.g., 55V) (Step S13), which in turn is applied to the specified shutter portions of the shutter array 331 under control of signals from the image data output controller 342, allowing the rolled photographic paper 31 to be exposed to the R color light (Step S14). And, the exposure on the one line of image data is ended.

It will be appreciated that since the disc-like color filter 333 is rotated at a constant speed and also is divided into non-uniform color regions in such a manner that the time required for the photographic paper to be exposed is optimized in response to sensitivities of the photographic paper or equivalent, the rolled photographic paper 31 can be correctly exposed to the color light of B, G, R. In other words, since the disc-like color filter 333 is divided into the non-uniform color regions, the time during which the color regions stays in the optical path is varied to select a suitable exposing time in response to sensitivities of the rolled photographic paper 31 or equivalent. This results in the correct exposure of the rolled photographic paper 31.

Next, a decision on whether or not the exposure of the last line of image in one frame has been completed is made (Step S15). If the decision is that the exposure of the last line of image on the image data has not yet been completed (in the case of NO at Step S15), the rolled photographic paper 31 is transported by only one line and the control is returned to Step S2. Then, the foregoing steps are repeated to make the exposure of the next one line. When the decision is, on the other hand, that the exposure of the last line is completed (in the case of YES at Step S15), the rolled photographic paper 31 is transported to the position where the next frame of image is exposed on the photographic paper (Step S16), and the control is returned to Step S1. The foregoing steps are repeated to make the exposure of the next one frame of image. In this embodiment, the photographic images are sequentially exposed on the photographic paper on a frame-by-frame basis along the transporting direction of the rolled photographic paper 31. Alternatively, two or more frames of photographic images may be exposed at a time in a widthwise direction of the photographic paper 31.

The rolled photographic paper 31, after exposed, is transported in sequence into the developing section 40 and is developed with the prescribed developing solution. And, the rolled photographic paper 31, after dried, is transported into the cutting section 50, in which the long rolled photographic paper 31 is cut along the widthwise direction into each individual frame with the cutter 51.

In the above-mentioned embodiment, the construction of dividing the disc-like color filter 333 into the non-uniform color regions of R, G, B provides the result that the amount of light from the exposing head 33 exposed onto the rolled photographic paper 31 is varied depending on color components.

Figure 8:
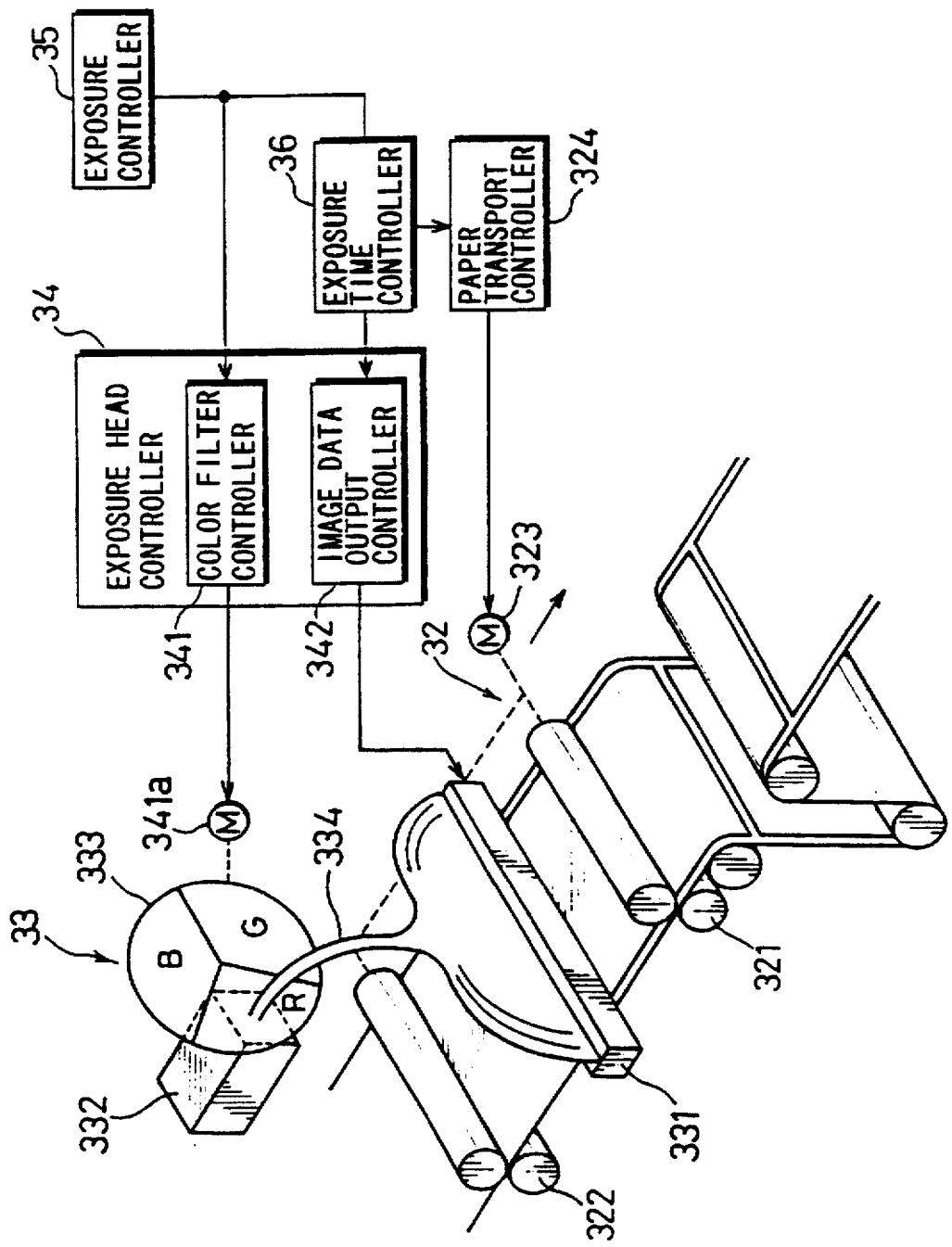
FIG. 8 is an illustration of a modified exposing head portion.

FIG. 8 shows a modified image exposing section 30 of the present invention. In this modification, the image exposing section comprises an exposure timing controller 36 for controlling a photographic paper transport controller 324 in the photographic paper transporting section 32 synchronization with the image data output controller 342 in the exposing head controller 34.

The photographic paper transporting section 32 drives the driving motor 323 to rotate in a forward direction and a reverse direction, under control of signals from the photographic paper transport controller 324, so that the rolled photographic paper 31 is reciprocated in its exposing position on a one-and-a-half-returns basis with respect to each frame of film image by the first and second pairs of transporting rollers 321, 322 and is transported in its alternate going and returning by a width corresponding to one line of image data with respect to each of the three colors of R, G, B at a time. The rate at which the rolled photographic paper 31 is transported is controlled to vary on a color-to-color basis so that the B color light, to which the photographic paper is highest sensitized, becomes shortest in the exposing time of the photographic paper and the color light R, to which the photographic paper is lowest sensitized, becomes longest.

Specifically, the photographic paper transporting section 32 allows the rolled photographic paper 31 to be transported a distance corresponding to one line of image data for the B color at a time in the downstream direction of forward transporting direction at a rate of 12.5 mm/sec., for example, for exposure of one frame of photographic image to the color B. After completion of the exposure of the photographic image to the color B, the rolled photographic paper 31 is transported by a width corresponding to one line of image data for the color G at a time in the upstream direction opposite to the forward transporting direction at a rate of 10.0 mm/sec., for example, for exposure of the photographic image on the color G. When the photographic paper is transported in the upstream direction, the image data is output from the reverse direction to when the photographic paper is transported in the forward transporting direction. When the exposure of the photographic image of the color G is completed, the rolled photographic paper 31 comes into a return to its start position with respect to the related frame. Again, the rolled photographic paper 31 is transported by a width corresponding to one line of image data for the R color at a time in the downstream direction at a rate of 8.3 mm/sec., for exposure of the photographic image to the color R.

It should be noted that under control of the exposure timing controller 36, the transporting rate of the rolled photographic paper 31 is varied and also, in response to the variations in the transporting rate, the delivery rate at which the image data is delivered to the image data output controller 342 is varied. In addition, the color regions of the disc-like color filter 333 is sequentially switched in synchronism with the shifts in the transporting direction of the rolled photographic paper 31. Therefore, the color filter in this modified embodiment is simply required to be segmented into uniform color regions in the circumferential direction, and is not required to be divided into non-uniform color regions, as in the above embodiment. Even if the color filter is separated into non-uniform regions, the rotational angle at which the color regions of the disc-like color filter are shifted from one to another may of course be altered according to the relative proportion at which the color filter are separated into such non-uniform regions.

At the reciprocating motion of the rolled photographic paper 31 on a one-and-a-half-returns basis, the exposure of one frame of photographic image is completed. The one-and-a-half-returns reciprocating motion is made with respect to every frame by the photographic paper transporting section 32. After the exposure of one frame of photographic image is completed, the photographic paper transporting section 32 drives the rolled photographic paper 31 to be transported to its start position with respect to the next frame.

The above-mentioned transporting rates of the photographic paper are determined in the following manner. As aforementioned with reference to FIG. 5, the light amount ratios of the B color light and the G color light to the R color light are found to be 1.5 and 1.2, respectively, with the R color light taken as 1. From these ratios it can be obtained that the ratio of the exposing time for the B color light to the exposing time on the R color light is 1/1.5=0.67 and the ratio of the exposing time on the G color light to the exposing time on the R color light is 1/1.2=0.83. From this result, it is understood that the transporting rates of the rolled photographic paper 31 for the B color light and the G color light, is made faster than that for the R color light by a rate of 1.5 and a rate of 1.2 respectively. This results in the above-mentioned transporting rates of the photographic paper on B, G, R being determined. It is to be noted that the responsive changes in the transporting rate of the rolled photographic paper 31 can be achieved with ease by the specific construction of this modified embodiment in which the rolled photographic paper 31 is transported on a reciprocating-motion basis with respect to each frame of photographic image and is then subjected to exposure on each of the three colors of R, G, B.

Further, while the above-mentioned transporting rates of the photographic paper are required to be varied depending on output performance characteristics of the exposing head portion 33 with respect to the color light, as in the case of the relative proportion of the color regions of the disc-like color filter 333, the measuring method for seeking the light amount ratios of the color light shown in FIG. 5 provides determination of the transporting rates of the photographic paper inclusive of the output performance characteristics of the exposing head 33.

Figure 9:
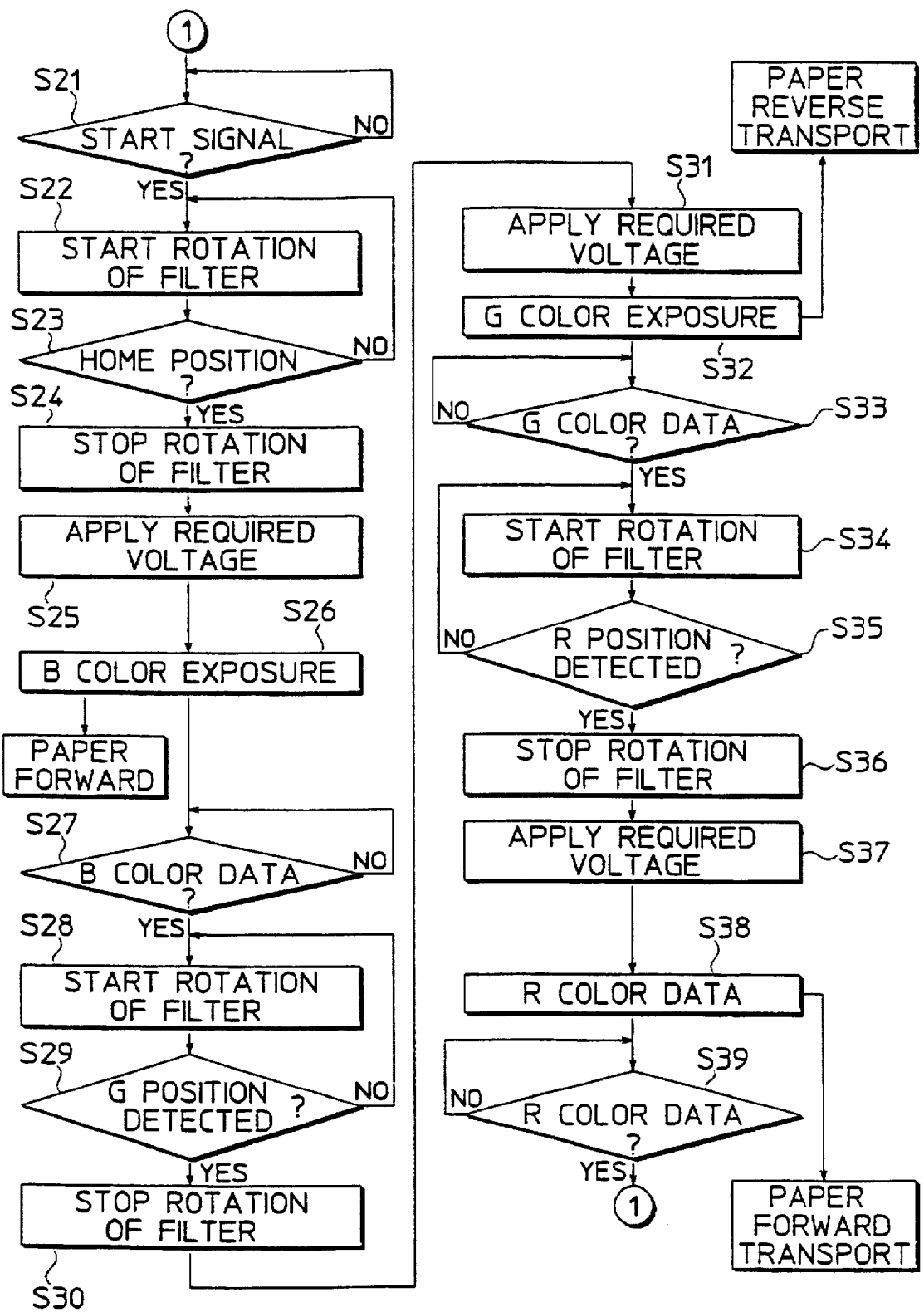
FIG. 9 is a flowchart illustrating operations of the exposing head portion of FIG. 8.

FIG. 9 is a flowchart illustrating an outline on the exposing operations of the exposing head portion 33 shown in FIG. 8. When the exposure controller 35 detects exposure starting signals (Step S21), the disc-like color filter 333 starts rotating (Step S22). Then, the position sensor makes a decision on whether or not the B color region of the disc-like color filter 333, whose color is the first color for exposure with respect to each frame, comes into the position of the white light source 332 (Step S23). This decision is made by the position sensor detecting the home position mark for specifying the position of the B color region. When the decision is that the B color region of the disc-like color filter 333 has come into the position of the white light source 332 (in the case of YES at Step 23), the disc-like color filter 333 is stopped rotating (Step S24).

Then, the driving voltage to be applied to the shutter array 331 is switched to a required voltage value (e.g., 45V) (Step S25), which in turn is applied to specified shutter portions of the shutter array 331 under control of signals from the image data output controller 342, allowing the rolled photographic paper 31 to be exposed to the B color light (Step S26). The exposure of the rolled photographic paper 31 to the B color light is made while the rolled photographic paper 31 is going downstream which is the forward transporting direction of the photographic paper. The rate at which the rolled photographic paper 31 is transported at this time is set to be 12.5 mm/sec., for example, under control of the photographic paper transport controller 324.

Next, the exposure of the photographic paper to the B color light by one line at a time is repeated, before a decision on whether or not the exposure of the last line of image in one frame has been completed is made (Step S27). When the decision is that the exposure of the last line has been completed (in the case of YES at Step S27), the disc-like color filter 333 is rotated (Step S28). Then, the position sensor makes a decision on whether or not the G color region of the disc-like color filter 333, whose color is the second color on exposure with respect to the same frame, comes into the position of the white light source 332 (Step S29). This decision is made by the position sensor detecting the position mark for specifying the position of the G color region. When the decision is that the G color region of the disc-like color filter 333 has come into the position of the white light source 332 (in the case of YES at Step 29), the disc-like color filter 333 is stopped rotating (Step S30).

Then, the driving voltage applied to the shutter array 331 is switched to a required voltage value (e.g., 50V) (Step S31), which in turn is applied to specified shutter portions of the shutter array 331 under control of signals from the image data output controller 342, allowing the rolled photographic paper 31 to be exposed to the G color light (Step S32). The exposure of the rolled photographic paper 31 to the G color light is made while the rolled photographic paper 31 is returning upstream which is opposite to the forward transporting direction of the photographic paper. The rate at which the rolled photographic paper 31 is transported at this time is set to be 10.0 mm/sec., for example, under control of the photographic paper transport controller 324.

Next, the exposure of the photographic paper to the G color light by one line at a time is repeated, before a decision on whether or not the exposure of the last line of image in the one frame has been completed is made (Step S33). When the decision is that the exposure of the last line has been completed (in the case of YES at Step S33), the disc-like color filter 333 is rotated (Step S34). Then, the position sensor makes a decision on whether or not the R color region of the disc-like color region 333, whose color is the last color for exposure with respect to the same frame, comes into the position of the white light source 332 (Step S35). This decision is made by the position sensor detecting the position mark for specifying the position of the R color region. When the decision is that the R color region of the disc-like color filter 333 has come into the position of the white light source 332 (in the case of YES at Step 35), the disc-like color filter 333 is stopped rotating (Step S36).

Then, the driving voltage applied to the shutter array 331 is switched to a required voltage value (e.g., 55V) (Step S37), which in turn is applied to specified shutter portions of the shutter array 331 under control of signals from the image data output controller 342, allowing the rolled photographic paper 31 to be exposed to the R color light (Step S38). The exposure of the rolled photographic paper 31 to the R color light is made while the rolled photographic paper 31 is traveling downstream, as in the case of the B color light. The rate at which the rolled photographic paper 31 is transported at the time is set to be 8.3 mm/sec., for example, under control of the photographic paper transport controller 324.

Next, the exposure of the photographic paper to the R color light by one line at a time is repeated, before a decision on whether or not the exposure of the last line of image in the one frame has been completed or not is made (Step S39). When the decision is that the exposure of the last line has been completed (in the case of YES at Step S39), the rolled photographic paper 31 is transported to the position where the next frame of image is exposed on the photographic paper, and the control is returned to Step S21. The foregoing steps are repeated to make the exposure of the next one frame of image.

The rolled photographic paper 31, after exposure, is transported in sequence into the developing section 40 and is developed with the prescribed developing solution, as is the case of the above-described embodiment. The rolled photographic paper 31, after being dried, is transported into the cutting section 50, in which the long rolled photographic paper 31 is cut along the widthwise direction into each individual frame.

In the embodiments as illustrated here, the rolled photographic paper 31 is reciprocated in its exposing position on an one-and-a-half-returns basis with respect to each frame of a film image, to be subjected to exposure in its going and returning. This embodiment may be modified in such a manner that the rolled photographic paper is reciprocated in its exposing position on a three-returns basis with respect to each frame of a film image at a time. In this modification, the rolled photographic paper is sequentially exposed to each color light of B, G, R, either in its going or in its returning directions. This case needs a transporting time twice as long as the case where the photographic paper 31 is transported on a one-and-a-half-returns basis, but no practical problem is provided. Further, in the embodiments described above, the rolled photographic paper 31 is reciprocated on a frame-by-frame basis. Alternatively, the rolled photographic paper 31 may be reciprocated by half of a frame at a time or by two or more frames at a time, or a film of frames at a time. In short, the rolled photographic paper 31 may be transported in a reciprocating manner by any desired number of frames at a time. In such a case, the exposure of the photographic paper to the color light is made by a selected number of frames at a time.

In addition, in the above-described embodiment, the exposing head portion 33 includes the shutter array 331 formed by the PLZT element, the white light source 332, the disc-like color filter 333, and the optical fibers 334. In place of the shutter array 331 formed by the PLZT element, a liquid crystal display (LCD) or equivalent may be used. This modified exposing head portion can also provide the same exposure control as the one using the shutter array 331 formed by the PLZT element. Further, in the case where the light amount is varied by changing the transporting rate of the rolled photographic paper 31, a light emitting diode (an LED) or equivalent may be used.

Further, the light amount adjuster for varying the light amount to be output onto the rolled photographic paper 31, which is constructed in the embodiment by the disc-like color filter 333 divided into different color regions, may be constructed by the color filter divided into uniform color regions, combined with means for changing the driving voltage to be applied to the shutter portions of the shutter array 331.

Also, the image data processing section 20, which in the already described embodiment is so designed as to allow one line of image data to be delivered to the line buffer 24, may be modified in such a manner that it allows two or more lines of image data to be delivered to the line buffer. The exposing head portion 33 would then expose each frame of image on the photograph paper on the basis of the two or more lines of image data.

The above-mentioned embodiments, in which the image data on the film 11 are captured by the image data capturing section 10, may be modified in such a manner that the image data inputted in a personal computer are captured and processed or edited by the image data processing section 20 and then the processed or edited image in each frame are exposed on the photographic paper.

Further, in the above-mentioned embodiments, each photographic image of the film 11 is separated into three color components of R, G, B captured as image data, which in turn is converted into light signals output onto the photographic paper. The colors selected are not necessarily limited to the three colors of R, G, B. Four colors (R, G, B plus another color) may be selected. In addition, other three-colors combinations than the R, G, B color combination may be selected. It is essential only that a photographic image exposed on the photographic paper is captured as image data, separated into a plurality of light-wavelength components, the image data being converted into light signals for different colors corresponding to the light-wavelength components, then the resulting light signals being output onto the photographic paper.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A photographic image exposing apparatus comprising:
    an exposing device which exposes photographic paper using light spectrums corresponding to separated color image components represented by image data;
    a light amount adjuster which adjusts amounts of light of said light spectrums exposing the photographic paper in correspondence with the separated color image components;

the exposing device including:
        a white light source: and
        a filtering device provided between the white light source and the photographic paper the filtering device having color filters corresponding to the light spectrums, respectively, and operating to interrupt with said color filters a light beam from the white light source traveling onto the photographic paper to separately allow corresponding ones of the light spectrums to pass therethrough; and
    the light amount adjuster effecting differing respective interrupting times of the color filters in accordance with respective predetermined exposure ranges to thereby adjust said amounts of light; and
    the filtering device including a disc member rotatable at a constant speed and having the color filters successively arranged in a circumferential direction, the color filters having different areas based upon said respective interrupting times of said color filters to thereby adjust said amounts of light.

2. The photographic image exposing apparatus according to claim 1, wherein the light amount adjuster adjusts the amounts of light of the light spectrums of the separated color image components based on respective sensitivities of the photographic paper for the light spectrums.

3. The photographic image exposing apparatus according to claim 1, wherein the light amount adjuster adjusts the amounts of light of the light spectrums of the separated color image components based on respective output performance characteristics of the exposing device for the light spectrums.

4. A photographic image exposing apparatus comprising:
    an exposing device which exposes photographic paper using light spectrums corresponding to separated color image components represented by image data;
    a light amount adjuster which adjusts amounts of light of said light spectrums exposing the photographic paper in correspondence with the separated color image components, and
    a paper transporting device reciprocatingly transporting the photographic paper a predetermined range, wherein the light amount adjuster changes the transporting speed of the transporting device in accordance with said separated color image components to thereby adjust said amounts of light.

5. The photographic image exposing apparatus according to claim 4, wherein the light amount adjuster adjusts the amounts of light of the light spectrums of the separated color image components based on respective sensitivities of the photographic paper for the light spectrums.

6. The photographic image exposing apparatus according to claim 4, wherein the light amount adjuster adjusts the amounts of light of the light spectrums of the separated color image components based on respective output performance characteristics of the exposing device for the light spectrums.

7. The photographic image exposing apparatus according to claim 4, wherein the exposing device executes exposure in forward and backward transportation directions of the paper transporting device, one of said light spectrums being generated along with exposure of said photographic paper by said exposing device in accordance with corresponding first data of said image data during transportation of said photogaphic paper in a first direction corresponding to said forward direction, and another one of said light spectrums being generated along with exposure of said photographic paper by said exposing device in accordance with corresponding second data of said image data during transportation of said photographic paper in a second direction, opposite to the first directions corresponding to said reverse direction.

8. The photographic image exposing apparatus according to claim 7, wherein the light amount adjuster adjusts the amounts of light of the light spectrums of the separated color image components based on respective sensitivities of the photographic paper for the light spectrums.

9. The photographic image exposing apparatus according to claim 7, wherein the light amount adjuster adjusts the amounts of light of the light spectrums of the separated color image components based on respective output performance characteristics of the exposing device for the light spectrums.

10. A photographic image exposing apparatus comprising:

an exposing device which exposes photographic paper using light spectrums corresponding to separated color image components represented by image data;

the exposing device including:

a white light source; and a filtering device having a rotating disc member with color filters successively arranged in a circumferential direction, the color filters corresponding to respective ones of said light spectrums and being disposed to successively interrupt a light beam transmitted from the white light source onto the photographic paper to separately allow said light spectrums to pass therethrough and onto the photographic paper; and a light amount adjuster for adjusting amounts light of said light spectrums exposing the photographic paper in accordance with the separated color image components by adjusting respective interrupting times of the color filters in accordance with predetermined exposure ranges to thereby adjust said amounts of light.

11. The photographic image exposing apparatus according to claim 10 wherein said disc member is rotatable at a constant speed and the color filters having different areas based upon said respective interrupting times of said color filters to thereby adjust said amounts of light.

12. The photographic image exposing apparatus according to claim 10 further comprising:

a paper transporting device for transporting the photographic paper through said exposing device over a predetermined frame distance wherein a transport speed of the photographic paper determines said respective interrupting times; and the light amount adjuster changing the transport speed of the transporting device and rotating said disc member in accordance with said separated color image components to effect said respective interrupting times to thereby adjust said amounts of light.

* * * * *